May 13, 1969  J. J. SLAVIN ET AL  3,443,750

CUMULATIVE VOTING INDICATOR

Filed April 25, 1966

INVENTORS:
JOHN J. SLAVIN
BY  JAMES P. STANLEY

ATTORNEYS

United States Patent Office 3,443,750
Patented May 13, 1969

3,443,750
CUMULATIVE VOTING INDICATOR
John J. Slavin, 4688 Haddington Lane, Bloomfield Hills, Mich. 48013, and James P. Stanley, 1033½ Cadieux Road, Grosse Pointe, Mich. 48236
Filed Apr. 25, 1966, Ser. No. 544,879
Int. Cl. G06c 27/00
U.S. Cl. 235—78                    3 Claims

ABSTRACT OF THE DISCLOSURE

A desk calculator having a pair of superimposed scale discs, one disc being calibrated in geometric progression to indicate the number of shares of a corporation to be voted, a second scale being divided into segments, each segment representing a zone establishing the upper and lower limiting numbers of shares, the total number of directors to be elected to the board of directors of the corporation, and the number of directors desired to be elected whereby either the minimum number of shares needed to elect a given number of directors of a corporation or the number of directors any given stockholder or group of stockholders can elect with the given number of shares the stockholder or group of stockholders controls may be determined.

---

Figure 1:
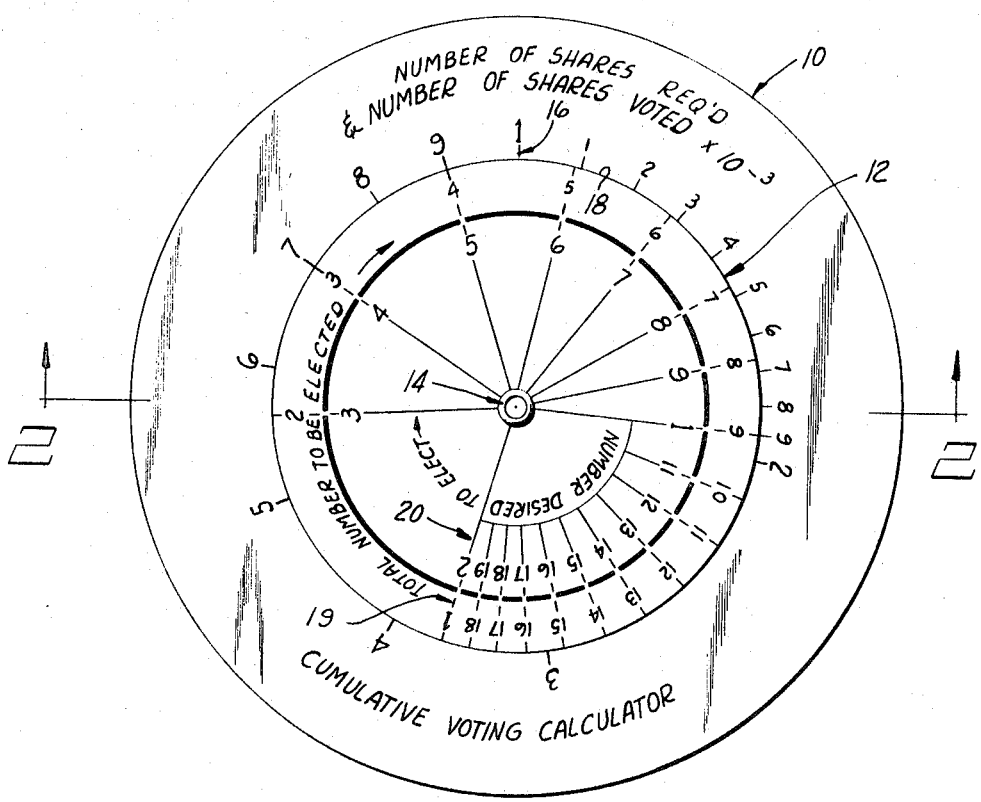

Our invention relates generally to desk calculators. It relates more particularly to a hand operated computer that may be used for determining readily the number of votes needed by a stockholder or a group of stockholders of a corporation to elect a given number of directors when the number of voting shares to be voted is known.

Most state statutes dealing with regulations for corporations provide for stockholders meetings at which the directors of the corporations are selected by vote of the stockholders. The franchise of the individual stockholders is represented by voting shares. In this way the individual stockholder has a measure of control over the conduct of the business of the corporation and over the selection of the corporate directors.

The regulatory statutes for corporations may permit the corporation by-laws to include provisions for cumulative voting of the shares. Individual stockholders or groups of stockholders then may combine their votes and cast them with the objective of electing a limited number of directors. In this way they many partially offset the control exercised by stockholders holding a disportionately large number of shares. Each stockholder is entitled to a number of votes equal to the number of voting shares he owns multiplied by the number of directors to be elected at any given election. Under the cumulative voting system he may cast all his votes for one candidate or a group of candidates fewer in number than the total number.

It is possible also for a given stockholder or a group of stockholders to obtain proxy statements from other stockholders that do not intend to exercise their franchise personally. These proxy votes can be added to their own votes and accumulated in the above fashion with the object of placing on the board at least a limited number of their chosen directors.

Cululative voting, if it is sanctioned by the statutes, is regulated by the corporation charter or by-laws or by an agreement among the stockholders. To determine how many shares one should hold or control to assure the election of a certain number of directors, it is necessary to multiply the total number of shares entitled to vote by the number of directors it desired to be eletced. This figure is divided by one more than the total number of directors to be elected. One share then is added to this quotient. For example, if in a given election the corporation has one thousand voting shares outstanding and if there are five directors to be eletced by the stockholders, any stockholder can elect to the board two directors out of the total number of five if he owns or controls at least two times one thousand, divided by five plus one, plus one, or three hundred and thirty-five shares.

The improvement of our invention makes it possible to predict accurately the number of shares that would be needed to elect a given number of directors to a board without the necessity of carrying out the mathematics described in the foregoing paragraph. We do this by means of a desk calculator with which any one of three variables can be determined if the other two variables are known. In this case the variables would be the total number of shares that will be voted, the number of directors desired to be elected and the number of directors to be elected. This makes it possible for investment counselors, attorneys and other individuals involved in corporate management counseling to advise their clients without the necessity for carrying out time consuming calculations which of necessity involve the possibility of human error as well as an inefficient use of office time.

The provision of an improved calculator of the type above set forth being an object of our invention, it is another object of our invention to provide a desk calculator for accurately determining visually the relationship between all the avriables involved in cumulative corporation voting. The structure of the mechanism we use for accomplishing this is both simple and inexpensive.

It is a further object of our invention to provide a calculator of the type above set forth wherein the relationship between the variables mentioned in the foregoing paragraph is established by the use of two, superimposed, arcuate, logarithmic scales on adjacent indicator discs that are mounted for rotation about a common center.

Figure 2:
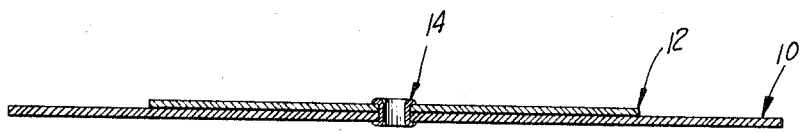

For the purpose of describing more particularly the improvements of our invention, reference will be made to the accompanying drawings wherein:

FIG. 1 shaws in plan view our improved calculator having the required logarithmic scales carried thereon; and, FIG. 2 is a cross sectional view, taken along the plane of section line 2—2 of FIG. 1.

In the drawings, numeral 10 designates a first base disc which, by preference, is circular in form, although this form is not required. Superimposed on the disc 10 is a circular disc 12 of a diameter that is less than the diameter of the disc 10. The discs 10 and 12 can be formed of cardboard, plastic or any other suitable sheet material. The disc 10 is pinned to the disc 12 by means of a suitable rivet or other fastener 14, thereby permitting the disc 12 to rotate with respect to disc 10.

Formed on disc 10 is a first logarithmic scale 16. This scale is located on a circle having a center coinciding with the center of the pivot 14. It is situated adjacent the outer margin 18 of the disc 12. The outer scale 16 represents the number of shares to be voted and the number of shares required. Located on the margin 18 of the disc 10 is a second logarithmic scale 19. This scale, which corresponds to the logarithmic scale 16, is designated to represent the total number of directors to be elected.

A radius is drawn from each integer in the scale on the margin 18 of the disc 12 to the center of discs. This divides the disc 12 into sectors. Each sector is represented by a number beginning with the integer 1 and continuing through the integer 9. A third scale 20 is located radially inwardly from the scale of margin 18. This scale, like the other two scales, is logarithmic in form although each integer of the scale is equal to one plus the integer in the corresponding scale of margin 18. Thus, the integer six in scale 20 will be directly opposite the integer five in the scale of margin 18. This scale 20 represents the number of directors desired to be elected. The segmental zone of the sector extending clockwise from the point at integer five on scale 20 and the point corresponding to the center of the discs indicates the number of shares needed to elect five directors. The other corresponding segmental zones are represented by the numbers one through nine.

The scale 20 is arranged so that its terminal integer 10 is located 360° from the initial integer one. In order to continue the scale beyond the 360° location, the segmental zones have been continued through an arc located in the first zone. These so-called sub-zones have been identified by the reference legends ten through nineteen. It is possible therefore for the operator to use the calculator if the number of directors desired to be elected is any number less than twenty.

In order to visually differentiate between the different zones, thhe arcuate segment between any two integers of scale 20 can be printed with a different color than the color of the corresponding segments in the next two adjacent zones.

To illustrate the operation of the invention, one can determine the number of shares needed to elect four directors as follows. The middle scale on the margin of the disc 18 carries the number of directors to be elected. If this number is four, the integer 4 is placed against the total number of shares to be voted, the latter number being located in the scale 16. If that number of shares is 9,000, the numeral 4 in the scale on the margin 18 of disc 12 is placed adjacent the integer 9 in scale 16. The operator then can read the number of shares required to elect any given number of directors. If, for example, it is desired to elect four directors, at least 7,201 shares would be required. Any number of shares between 7,201 and 9,000 then will elect four directors. If it is desired to elect three directors, any number of shares between 5,401 and 7,201 will be required. This is done by reading in scale 16 the number of shares corresponding to the third zone. Zone three will establish the maximum and minimum limits of the number of shares required out of the total number of shares to be voted.

The operator can also determine the number of directors that can be elected with any given number of shares. This is done by placing the total number of directors to be elected in scale 20 against the total number of shares to be voted in scale 16. The operator then can read off the number of directors that can be elected from scale 20. In the above example, if it is known that there are nine thousand shares to be voted and that four directors are to be elected, and if the number of shares accumulated is known, the scale 20 will tell the operator that three directors can be elected if the total accumulated vote is between 5401 and 7201 shares.

Having thus described a preferred form of our invention, what we claim and desire to secure by U.S. Letters Patent is:

1. A cumulative voting indicator comprising a first disc and a second disc that are pivoted for rotation about a common center, a circular logarithmic scale formed on said first disc adjacent the margin of said second disc, a second scale formed on said second disc in registry with said first scale, and a third scale formed on said second disc at a radially inward location with respect to said second scale, said second and third scales being logarithmic in form and being formed on an arc with centers corresponding to said disc center, said first scale representing the number of shares to be voted, said second scale having integers representing the number of directors to be elected and said third scale having integers representing the number of directors desired to be elected, said integers being functionally related as follows:

$$\frac{(\text{first scale reading}) \times (\text{third scale reading})}{(\text{second scale reading}) + 1} + 1 = \text{number of shares held or controlled}$$

2. The combination as set forth in claim 1 wherein the integers in said third scale are equal to one plus the adjacent integers in said second scale.

3. The combination as set forth in claim 2 wherein the integers in said first scale, the integers in said second scale and the integers in said third scale are located on a radial line drawn from said center when any given integer in said second scale is rotated so that it registers with any given integer in said first scale.

References Cited
UNITED STATES PATENTS 2,221,924  11/1940  Pickworth _____ 235—88
3,309,017  3/1967   Koskela _____ 235—78

STEPHEN J. TOMSKY, *Primary Examiner.*

U.S. Cl. X.R.

235—88